Feb. 28, 1961   J. M. NYS ET AL   2,973,264
SENSITIZED PHOTOGRAPHIC EMULSIONS
Filed March 4, 1958   2 Sheets-Sheet 1

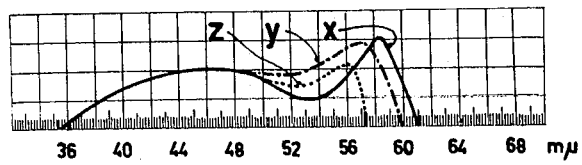

Fig. 1

X = bis-(2-(1-beta-acetoxyethyl-3-ethyl-5,6-dichlorobenzimidazole))-trimethine cyanine iodide Y = bis-[2-(1-beta-acetoxyethyl-3-ethyl-5,6-dichlorobenzimidazole)]-trimethine cyanine iodide plus [2-(1-beta-hydroxyethyl-3-ethyl-5,6-dichlorobenzimidazole)] - [2-(3-ethyl-5-phenylbenzoxazole)]-tri methine cyanine p-tolusulphonate Z = (2-(1-beta-hydroxyethyl-3-ethyl-5,6-dichlorobenzimidazole))-(2-(3-ethyl-5-phenylbenzoxazole))-trimethine cyanine p-tolusulphonate

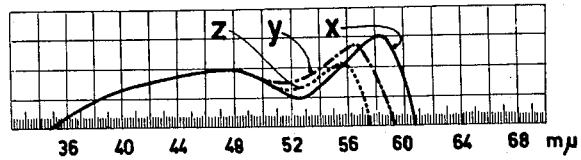

Fig. 2

X = bis-[2-(1,3-diethyl-5,6-dichlorobenzimidazole)]-trimethine cyanine iodide

Y = bis-(2-(1,3-diethyl-5,6-dichlorobenzimidazole))-trimethine cyanine iodide plus (2-(1-beta-acetoxyethyl-3-ethyl-5,6-dichlorobenzimidazole))-(2-(3-ethyl-5-p-tolyl-benzoxazole))trimethine cyanine iodide Z = (2-(1-beta-acetoxyethyl-3-ethyl-5,6-dichlorobenzimidazole))-(2-(3-ethyl-5-p-tolyl-benzoxazole))trimethine cyanine iodide INVENTORS
J. M. Nys
BY T. H. Ghys
ATTYS.

Feb. 28, 1961    J. M. NYS ET AL    2,973,264
SENSITIZED PHOTOGRAPHIC EMULSIONS
Filed March 4, 1958    2 Sheets-Sheet 2

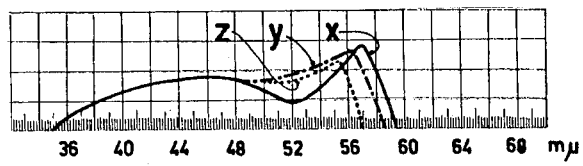

Fig. 3

X = [2-(1-beta-acetoxyethyl-3-ethyl-5,6-dichlorobenzimidazole)] -[2-(1,3-diethyl-benzimidazole)] -trimethine cyanine iodide Y = [2-(1-beta-acetoxyethyl-3-ethyl-5,6-dichlorobenzimidazole)] -[2-(1,3-diethyl-benzimidazole)] -trimethine cyanine iodide plus [2-(1-ethyl-5-p-carboxybenzyl-5,6-dichlorobenzimidazole)] -[2-(3-ethyl-5-p-tolyl-benzoxazole)] trimethine cyanine bromide Z = [2-(1-ethyl-3-p-carboxybenzyl-5,6-dichlorobenzimidazole)] -[2-(3-ethyl-5-p-tolyl-benzoxazole)] trimethine cyanine bromide

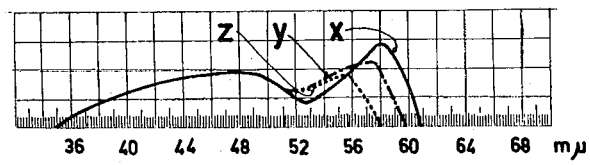

Fig. 4

X = bis-[2-(1,3-diethyl-5,6-dichlorobenzimidazole)] trimethine cyanine iodide

Y = bis-[2-(1,3-diethyl-5,6-dichlorobenzimidazole)] trimethine cyanine iodide plus [2-(1,3-diethyl-5-chloro-benzimidazole)] -[2-(3-ethyl-5-p-tolyl-benzoxazole)] trimethine cyanine iodide Z = [2-(1,3-diethyl-5-chloro-benzimidazole)] -[2-(3-ethyl-5-p-tolyl-benzoxazole)] trimethine cyanine iodide INVENTORS
J. M. Nys
BY T. H. Ghys
ATTYS.

United States Patent Office 2,973,264
Patented Feb. 28, 1961

2,973,264
SENSITIZED PHOTOGRAPHIC EMULSIONS

Jean Marie Nys, Mortsel-Antwerp, and Theofiel Hubert Ghys, Edegem-Antwerp, Belgium, assignors to Gevaert Photo-Producten N.V., Mortsel, Belgium, a Belgian company Filed Mar. 4, 1958, Ser. No. 719,049

Claims priority, application Great Britain Mar. 6, 1957

3 Claims. (Cl. 96—104)

This invention relates to improvements in sensitized photographic emulsions, and more particularly to the production of dye-sensitized silver halide emulsions with improved sensitivity in the green region of the spectrum.

Photographic silver halide emulsions have a certain natural sensitivity to light, but this is restricted to a short range of wavelengths in the ultraviolet and/or blue regions of the spectrum. The effect of incorporating a sensitizing dye is to impart to the emulsion a sensitivity to light of other wavelengths. Sensitizing dyes which sensitize for the green are for example described and claimed in British patent applications 30,312/55, specification No. 812,924 published May 6, 1959, and 2,948/57, specification No. 815,172 published June 17, 1959.

It is known in the art of making photographic emulsions that the sensitization produced by a given dye varies somewhat with the type of emulsion in which the dye is incorporated.

Furthermore, it is known that the presence of a color coupler in the emulsion may partly or wholly destroy the spectral sensitivity conferred on the emulsion by the sensitizing dye; in some rare cases however, the sensitizing action of the sensitizing dye is enhanced by the presence of certain color couplers.

Furthermore, the sensitization of a given emulsion by a given dye may be altered by varying the conditions in the emulsion. For example, the sensitization may be increased by enhancing the silver ion concentration or decreasing the hydrogen ion concentration (that is increasing the alkalinity) or both. Thus sensitization can be increased by bathing plates, coated with a spectrally sensitized emulsion, in water or in aqueous ammonia solutions. Such a process of altering the sensitivity of a sensitized emulsion by increasing the silver ion concentration and/or by decreasing the hydrogen ion concentration is commonly called "hypersensitisation." Hypersensitized emulsions generally have poor keeping qualities.

It has further been known for some time that the effect of incorporating two or more sensitizing dyes in the emulsion is not always the simple sum of their individual effects, and that sometimes an additional sensitivity is obtained. Combinations of dyes which give the latter result are known as supersensitizing combinations. Thus, supersensitization occurs when the total optical sensitization produced by the combination of two or more dyes is greater than that which can be produced by any dye of the combination alone at any concentration, providing of course that the total concentration of the dyes in the supersensitizing combination is not in excess of the optimum concentration for the combination.

It has now been found that the sensitivity in the green region of the spectrum of photographic silver halide emulsions, especially green-sensitive silver halide emulsions for a multi-layer light-sensitive material for colour photography sensitized with symmetrical or unsymmetrical benzimidazolo carbocyanine dyes as defined hereinafter, can be enhanced and improved by incorporating in the emulsion a benzimidazolo-benzoxazolo carbocyanine dye as hereinafter defined. Since the conditions in the emulsion, that is the hydrogen ion and/or silver ion concentration, undergo little or no change in our method, we will designate our new method as a kind of supersensitization.

It is, therefore, an object of our invention to provide photographic emulsions containing certain symmetrical or unsymmetrical benzimidazolo carbocyanine dyes and, as supersensitizers therefor, certain benzimidazolo-benzoxazolo carbocyanine dyes. Another object is to provide a process for preparing these sensitized emulsions. Other objects will become apparent from a consideration of the following description and examples.

According to the present invention, there is provided a photographic silver halide emulsion sensitized with a supersensitizing combination of at least one symmetrical or unsymmetrical benzimidazolo carbocyanine dye represented by the general Formula I:

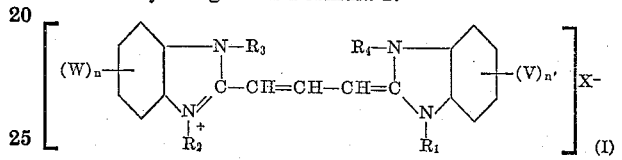

wherein:

V and W each represents a halogen atom, $n$ represents 1 or 2, $n'$ represents 0, 1 or 2, $R_1$, $R_2$, $R_3$ and $R_4$ each represents an alkyl group, such as e.g. methyl, ethyl, n-propyl, carbethoxymethyl, benzyl, p-carboxybenzyl, allyl, beta-methyl sulphonyl amino ethyl, omega-acetyl sulphonamido propyl, omega-acetyl sulphonamido butyl, hydroxyethyl and acetoxyethyl, or an aryl group, and $X^-$ represents an acid radical such as e.g. chloride, iodide, bromide, perchlorate, p-toluene sulphonate, benzene sulphonate, ethylsulphate and methyl sulphate (this acid radical may occasionally form part of the group $R_1$ or $R_2$: in this case, the dyestuff has a betaine or sulpho-betaine structure), and at least one benzimidazolo-benzoxazolo carbocyanine dye represented by the following general Formula II:

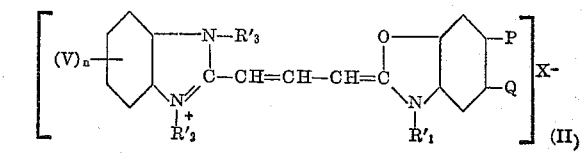

wherein:

V represents a halogen atom or a carbalkoxy- or acyl group, $n$ represents 1 or 2, P represents a hydrogen atom or an alkyl group such as e.g. methyl and ethyl, Q represents a hydrogen atom or an alkyl groups such as e.g. methyl and ethyl, or an aryl group such as e.g. phenyl and p-tolyl, $R'_1$, $R'_2$ and $R'_3$ each represents an alkyl group, such as e.g. methyl, ethyl, n- propyl, carbethoxymethyl, benzyl, p-carboxybenzyl, allyl, beta-methyl sulphonyl aminoethyl, omega-acetyl sulphonamido propyl, omega-acetyl sulphonamido butyl, hydroxyethyl and acetoxyethyl, or an aryl group, and $X^-$ represents an acid radical such as e.g. chloride, iodide, bromide, perchlorate, p-toluene sulphonate, benzene sulphonate, ethylsulphate and methyl sulphate (this acid radical may occasionally form part of the group $R_1$ or $R_2$: in this case, the dyestuff has a betaine or sulpho-betaine structure).

Dyestuffs of the general Formula I, and their preparation, are described in Belgian specification 510,948 (symmetrical dyestuffs) and British patent application 2,948/57 (unsymmetrical dyestuffs).

The following are examples of specific dyestuffs of general Formula I which may be employed, the dyestuffs being lettered to facilitate subsequent reference:

IA: bis - [2 - (1 - beta - acetoxyethyl - 3 - ethyl - 5,6-dichlorobenzimidazole)]-trimethine cyanine iodide
IB: bis - [2 - (1,3 - diethyl - 5,6 - dichlorobenzimidazole)]-trimethine cyanine iodide
IC: [2 - (1 - beta - acetoxyethyl - 3 - ethyl - 5,6 - dichlorobenzimidazole)] [2 - (1,3 - diethylbenzimidazole)]-trimethine cyanine iodide
ID: di - [2 - (1 -beta - hydroxyethyl - 3 - ethyl - 5,6-dichlorobenzimidazole)]-trimethine cyanine iodide
IE: di - [2 - (1 - ethyl - 3 - omega - acetyl - sulphonamidopropyl - 5,6 - dichlorobenzimidazole)] - trimethine cyanine bromide
IF: di - [2 - (1,3 - diethyl - 5 - chlorobenzimidazole)]-trimethine cyanine iodide
IG: di - [2 - (1,3 - diethyl - 5 - bromobenzimidazole)]-trimethine cyanine bromide The foregoing dyes may be prepared by the methods described in the above-mentioned Belgian specification and British patent application No. 30,312/55 and some of them are specifically described therein. The other dyes of general Formula I may be prepared by varying the character of the starting materials.

Dyestuffs of the general Formula II, and their preparation, are described in British patent application No. 30,312/55. The following are examples of specific dyestuffs of general Formula II which may be employed, the dyestuffs being lettered to facilitate subsequent reference:

IIA: [2 - (1 - beta - hydroxyethyl - 3 - ethyl - 5 - 6 - dichlorobenzimidazole)] - [2 - (3 - ethyl - 5 - phenylbenzoxazole)]-trimethine cyanine p-tolusulphonate
IIB: [2 - (1 - beta - acetoxyethyl - 3 - ethyl - 5 - 6 - dichlorobenzimidazole)] - [2 - (3 - ethyl - 5 - p - tolylbenzoxazole)]trimethine cyanine iodide
IIC: [2 - (1 - ethyl - 3 - p - carboxybenzyl - 5 - 6 - dichlorobenzimidazole)] - [2 - (3 - ethyl - 5 - p - tolylbenzoxazole)]trimethine cyanine bromide
IID: [2 - (1 - 3 - diethyl - 5 - chloro - benzimidazole)]- [2 - (3 - ethyl - 5 - p - tolyl-benzoxazole)]trimethine cyanine iodide
IIE: [2 - (3 - p - carboxybenzyl - 5 - p - tolyl - benzoxazole)] - [2 - (1 - beta - acetoxyethyl - 3 - ethyl - 5 - 6 - dichlorobenzimidazole)]trimethine cyanine iodide
IIF: [2 - (3 - ethyl - 5 - phenyl - benzoxazole)] - [2- (1 - 3 - diethyl - 5 - bromobenzimidazole)]trimethine cyanine idodide
IIG: [2 - (3 - ethyl - 5 - phenyl - benzoxazole)] - [2- (1 - ethyl - 3 - p - carboxybenzyl - 5 - 6 - dibromobenzimidazole)]trimethine cyanine betaine
IIH: [2 - (3 - ethyl - 5 - phenyl - benzoxazole)] - [2- (1 - 3 - diethyl - 5 - 6 - dichlorobenzimidazole)]trimethine cyanine p-tolusulphonate
III: [2 - (3 - benzyl - 5 - phenyl-benzoxazole)] - [2- (1 - beta - acetoxyethyl - 3 - benzyl - 5 - 6 - dichlorobenzimidazole)]trimethine cyanine bromide
IIJ: [2 - (3 - ethyl - 5 - phenyl - benzoxazole)] - [2- (1 - ethyl - 3 - beta - methylsulphonylaminoethyl - 5 - 6 - dichlorobenzimidazole)]trimethine cyanide iodide
IIK: [2 - (3 - ethyl - 5 - phenyl - benzoxazole)] - [2- (1 - ethyl - 3 - omega - acetyl - sulphonamidobutyl-5-6-dichloro-benzimidazole)]trimethine cyanine bromide
IIL: [2 - (3 - ethyl - 5 - phenyl - benzoxazole)] - [2- (1 - 3 - diethyl - 5 - carbethoxybenzimidazole)]trimethine cyanine p-tolusulphonate
IIM: [2 - (3 - ethyl - 5 - phenyl - benzoxazole)] - [2- (1 - 3 - diethyl - 5 - acetylbenzimidazole)]trimethine cyanine p-tolusulphonate
IIN: [2 - (3 - ethyl - benzoxazole)] - [2 - (1 - beta - hydroxyethyl - 3 - ethyl - 5 - 6 - dichlorobenzimidazole)]-trimethine cyanine ethylsulphate
IIO: [2 - (3 - p - carboxybenzyl - 5 - 6 - dimethylbenzoxazole)] - [2 - (1 - ethyl - 3 - p - carboxybenzyl-5-6-dichlorobenzimidazole)]trimethine cyanine bromide.

The foregoing dyes may be prepared by the method described in British patent application No. 30,312/55 and some of them are specifically described therein. The other dyes of Formula II may be prepared by varying the character of the starting materials.

The dyes according to Formula I possess a very characteristic sensitization spectrum which is well known to those skilled in the art and are very suitable for sensitizing the green-sensitive emulsion layer of a multi-layer material for color photography since the action of these sensitizing dyes is not impaired by the presence of color couplers.

The main feature of the sensitization spectrum is that their sensitization curve shows a very high second maximum around 570–580 mu according to their chemical structure, but on the contrary a rather low and wide minimum around 520–530 mu so that the emulsions sensitized in this way possess only a low sensitivity to that part of the spectrum.

Besides a higher sensitivity in the region of 520–530 mu it may be desirable for some emulsions that the sensitization region would not extend so far to the longer wavelengths.

When a dye according to the general Formula II is used in combination with a dye according to general Formula I, not only a normal supersensitization effect is observed, as shown by the sensitivity obtained which is higher than the optimum sensitivity obtainable with each of both dyes separately, but moreover the sensitization spectrum is shortened and the sensitivity in the range of 520–530 mu is very strongly enhanced. It is to be noted that in some cases the supersensitizing effect is more pronounced when simultaneously using color couplers.

The present invention is particularly directed to the ordinarily employed gelatin-silver-halide emulsions. However, the supersensitizing combinations can be employed in silver halide emulsions in which the carrier is other than gelatin, for example a resinous substance or cellulosic material which has no deteriorating effect on the light-sensitive materials.

The sensitizing dyes can be employed in various concentrations depending upon the effects desired. As is well known in the art the sensitivity conferred on an emulsion by a sensitizing dye does not increase proportionately to the concentration of the dye in the emulsion but rather passes through a maximum as the concentration is increased.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of the supersensitizing combinations of the present invention can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

The methods of incorporating sensitizing dyes into emulsions are well known to those skilled in the art. In practising the present invention, the sensitizing dyes can be incorporated into the emulsions separately or together. It is convenient to add the dyes separately in the form of solutions in appropriate solvents. Methanol and ethanol, especially the former, have proved satisfactory as solvents for the dyes employed in the present invention, although acetone has also been found to be satisfactory in certain cases. The dyes are advantageously incorporated in the finished washed emulsions and should be uniformly distributed throughout the emulsions.

The following procedure is satisfactory: stock solutions of the sensitizing dyes desired are prepared by dissolving the dyes in appropriate solvents as described above. Then, to the flowable gelatino-silver-halide emulsion, the desired amounts of the stock solution of one of the dyes is slowly added while stirring the emulsion. Stirring is continued until the dye is thoroughly incorporated into the emulsion. Then the desired amount of the stock solution of the second dye is slowly added to the emulsion while stirring. Stirring is continued until the second dye is thoroughly incorporated. The supersensitized emulsion can then be coated in a suitable thickness on a suitable support, such as glass, cellulose derivative film, synthetic resin film, or paper, and dried. The details of such coating methods are well known to those skilled in the art.

The amounts of the individual sensitizing dyes incorporated into the emulsion will vary somewhat from dye to dye according to the emulsion employed and to the effect desired. The regulation and adoption of the most useful proportions will be apparent to those skilled in the art upon making the ordinary observations and tests customarily employed in the art. Accordingly, the foregoing procedures and proportions are to be regarded only as illustrative. The invention is clearly directed to any emulsion containing a combination of the aforesaid sensitizing dyes whereby a supersensitizing effect is obtained.

The following examples will serve to illustrate further the manner of practising the invention.

To different portions of the same bath of photographic gelatino-silver-bromo-iodide emulsion, containing 38 g. silver per kg. emulsion, were added:

(1) A symmetrical or unsymmetrical benzimidazolo carbocyanine dye of Formula I,
(2) A symmetrical or unsymmetrical benzimidazolo carbocyanine dye of Formula I and a magenta color coupler,
(3) A benzimidazolo-benzoxazolo carbocyanine dye of Formula II,
(4) A benzimidazolo-benzoxazolo carbocyanine dye of Formula II and a magenta color coupler,
(5) A combination of a symmetrical or unsymmetrical benzimidazolo carbocyanine dye of Formula I and a benzimidazolo-benzoxazolo carbocyanine dye of Formula II, and
(6) A combination of a symmetrical or unsymmetrical benzimidazolo-carbocyanine dye of Formula I, a benzimidazolo-benzoxazolo carbocyanine dye of Formula II and a magenta color coupler.

The different portions of emulsions were then coated on supports and exposed in the usual manner in a spectrograph and a sensitometer through a yellow filter, for instance a filter which substantially transmits no light of wavelengths shorter than 495 mu, for example a filter sold under the name "Geva" No. 4 filter.

The following are several examples of such emulsions together with the speed (minus blue) obtained after development of the exposed emulsion coatings in the usual manner.

| Examples | Dye of Formula I, mg. per kg. emulsion | Dye of Formula II, mg. per kg. emulsion | Color coupler, g. per kg. emulsion | Speed (minus blue) | Sensitivity Curve |
|---|---|---|---|---|---|
| 1(a) | IA—15 | | | 100 | x in Fig. 1. |
| 1(b) | IA—15 | | 10 | 45 | |
| 1(c) | | IIA—20 | | 85 | |
| 1(d) | | IIA—20 | 10 | 22 | |
| 1(e) | IA—15 | IIA—20 | | 165 | |
| 1(f) | IA—15 | IIA—20 | 10 | 185 | |
| 1(g) | | IIA—40 | | 118 | z in Fig. 1. |
| 1(h) | | IIA—40 | 10 | 40 | |
| 1(i) | IA—15 | IIA—40 | | 182 | y in Fig. 1. |
| 1(j) | IA—15 | IIA—40 | 10 | 190 | |
| 1(k) | | IIA—60 | | 107 | |
| 1(l) | | IIA—60 | 10 | 37 | |
| 1(m) | IA—15 | IIA—60 | | 150 | |
| 1(n) | IA—15 | IIA—60 | 10 | 145 | |
| 2(a) | IB—20 | | | 100 | x in Fig. 2. |
| 2(b) | IB—20 | | 10 | 65 | |
| 2(c) | | IIB—20 | | 87 | z in Fig. 2. |
| 2(d) | | IIB—20 | 10 | 33 | |
| 2(e) | IB—20 | IIB—20 | | 145 | y in Fig. 2. |
| 2(f) | IB—20 | IIB—20 | 10 | 150 | |
| 3(a) | IC—30 | | | 100 | x in Fig. 3. |
| 3(b) | IC—30 | | 10 | 50 | |
| 3(c) | | IIC—30 | | 82 | z in Fig. 3. |
| 3(d) | IC—30 | IIC—30 | | 166 | y in Fig. 3. |
| 3(e) | IC—30 | IIC—30 | 10 | 145 | |
| 4(a) | IB—30 | | | 100 | x in Fig. 4. |
| 4(b) | IB—30 | | 10 | 69 | |
| 4(c) | | IID—20 | | 59 | z in Fig. 4. |
| 4(d) | | IID—20 | 10 | 30 | |
| 4(e) | IB—30 | IID—20 | | 105 | y in Fig. 4. |
| 4(f) | IB—30 | IID—20 | 10 | 115 | |
| 4(g) | IB—30 | IID—40 | | 90 | |
| 4(h) | IB—30 | IID—40 | 10 | 100 | |

The accompanying drawing illustrates the supersensitizing effect obtained with the new combinations. Each of the Figures 1 to 4 of the accompanying drawing is a diagrammatic reproduction of three spectrographs corresponding to the Examples 1(a), (g) and (i), 2(a) (c) and (e), 3(a), (c) and (d) and 4(a), (c) and (e) respectively. In each figure the sensitivity of the emulsion containing the carbocyanine dye of Formula I is represented by the curve x, and the sensitivity of the emulsion containing the carbocyanine dye of Formula II is represented by the curve z. The curve y represents in each figure the sensitivity conferred on the emulsion by the combination of the carbocyanine dye of the Formula I and the carbocyanine dye of the Formula II.

The color coupler incorporated in some of the emulsions is the 5-hexadecenyl-succinyl aminoindazolone. The sensitizing dyes IA, IB, IC, IIA, IIB, IIC and IID are those described above.

In Fig. 1, curve x represents the sensitivity of an ordinary gelatino-silver-bromo-iodide emulsion sensitized with bis-[2-(1-beta-acetoxyethyl-3-ethyl-5-6-dichlorobenzimidazole)]-trimethine cyanine iodide; curve z represents the sensitivity of the same emulsion containing [2-(1-beta-hydroxyethyl-3-ethyl - 5,6 - dichlorobenzimidazole)]-[2-(3-ethyl-5-phenylbenzoxazole)]-trimethine cyanine p-tolusulphonate, and curve y represents the sensitivity of the same emulsion containing bis-[2-(1-beta-acetoxyethyl - 3 - ethyl - 5,6 - dichlorobenzimidazole)]-trimethine cyanine iodide and [2-(1-beta-hydroxyethyl-3-ethyl-5,6-dichlorobenzimidazole)] - [2-(3-ethyl-5-phenyl-benzoxazole)]-trimethine cyanine p-tolusulphonate. The sensitometric meansurements for these emulsions are given in Ex. 1(a), (g) and (i) of the above table.

In Fig. 2, curve x represents the sensitivity of an ordinary gelatino-silver-bromo-iodide emulsion sensitized with bis-[2-(1,3-diethyl-5,6-dichlorobenzimidazole)] - trimethine cyanine iodide; curve z represents the sensitivity of the same emulsion containing [2-(1-beta-acetoxyethyl-3-ethyl-5,6-dichlorobenzimidazole)] - [2-(3-ethyl-5-p-tolyl-benzoxazole)]-trimethine cyanine iodide, and curve y represents the sensitivity of the same emulsion containing bis - [2 - (1,3-diethyl-5,6-dichlorobenzimidazole)]-trimethine cyanine iodide and [2-(1-beta-acetoxyethyl-3- ethyl-5,6-dichlorobenzimidazole)] - [2(3 - ethyl-5-p-tolyl-benzoxazole)]-trimethine cyanine iodide. The sensitometric measurements for these emulsions are given in Ex.2(a), (c) and (e) of the above table.

In Fig. 3, curve x represents the sensitivity of an ordinary gelatino-silver-bromo-iodide emulsion sensitized with [2 - (1-beta - acetoxyethyl-3-ethyl-5,6-dichlorobenzimidazole)]-[2-(1,3-diethylbenzimidazole)]-trimethine cyanine iodide; curve z represents the sensitivity of the same emulsion containing [2-(1-ethyl-3-p-carboxybenzyl-5,6-dichlorobenzimidazole)] - [2-(3-ethyl-5-p-tolyl-benzoxazole)]-trimethine cyanine bromide, and curve y represents the sensitivity of the same emulsion containing [2-(1-beta-acetoxyethyl-3-ethyl-5,6-dichlorobenzimidazole)] - [2-(1,3-diethyl-benzimidazole)]-trimethine cyanine iodide and [2-(1-ethyl-3-p-carboxybenzyl-5,6-dichlorobenzimidazole)] - [2 - (3-ethyl-5-p-tolyl-benzoxazole)]-trimethine cyanine bromide. The sensitometric measurements for these emulsions are given in Ex.3(a), (c) and (d) of the above table.

In Fig. 4, curve x represents the sensitivity of an ordinary gelatino-silver-bromo-iodide emulsion sensitized with bis-[2-(1,3-diethyl-5,6-dichlorobenzimidazole)]-trimethine cyanine iodide; curve z represents the sensitivity of the same emulsion containing [2-(1,3-diethyl-5-chloro-benzimidazole)] - [2 - (3 - ethyl-5-p-tolyl-benzoxazole)]-trimethine cyanine iodide, and curve y represents the sensitivity of the same emulsion containing bis - [2 - (1,3-diethyl-5,6-dichlorobenzimidazole)]-trimethine cyanine iodide and [2-(1,3-diethyl-5-chlorobenzimidazole)] - [2 - (3 - ethyl - 5-p-tolyl-benzoxazole)] trimethine cyanine iodide. The sensitometric measurements for these emulsions are given in Ex. 4(a), (c) and (e) of the above table.

In the above table it will be noted that the sensitivity of the emulsions sensitized with one of the dyes of Formula I or of Formula II separately is markedly decreased when the emulsion contains also the color coupler mentioned hereinbefore, see e.g. Examples 1(b) and (h); 2 (b) and (d); 3(b) and 4(b) and (d).

In the same table it will further be noted, however, that the sensitivity of the emulsions sensitized according to the invention with a supersensitizing combination of a dye of Formula I and of a dye of Formula II, is no longer detrimentally influenced by the presence of the color coupler in the emulsion, but is in many cases enhanced by the presence of this color coupler: see e.g. Examples 1(j), 2(f) and 4(f).

We claim:
1. A photographic silver halide emulsion sensitized with a supersensitizing combination of at least one carbocyanine dye selected from those represented by the following general formula:

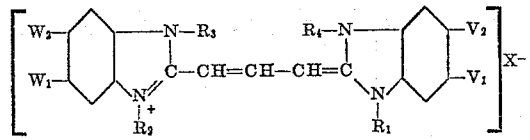

wherein:

$W_1$, $W_2$, $V_1$ and $V_2$ each represents a member selected from the group consisting of a halogen atom and a hydrogen atom, at least one of $W_1$, $W_2$, $V_1$ and $V_2$ being a halogen atom; $R_1$, $R_2$, $R_3$ and $R_4$ each represents a member selected from the group consisting of an alkyl group and aryl group, and X represents an acid radical, and at least one carbocyanine dye selected from those represented by the following general formula:

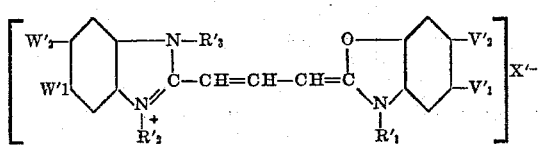

wherein:

$W'_1$ and $W'_2$ each represents a member selected from the group consisting of a halogen atom, a carbalkoxy group, an acyl group and a hydrogen atom, at least one of $W_1$ and $W_2$ being a member selected from the group consisting of a halogen atom, a carbalkoxy group and an acyl group; $V'_2$ represents a member selected from the group consisting of a hydrogen atom and an alkyl group; $V'_1$ represents a member selected from the group consisting of a hydrogen atom, an alkyl group and an aryl group; $R'_1$, $R'_2$ and $R'_3$ each represents a member selected from the group consisting of an alkyl group and an aryl group, and X' represents an acid radical.

2. A photographic silver halide emulsion sensitized with a supersensitizing combination of at least one carbocyanine dye selected from those represented by the following general formula:

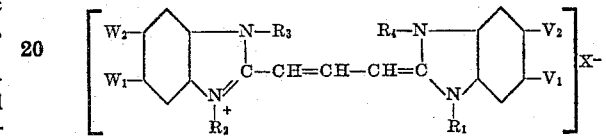

wherein:

$W_1$, $W_2$, $V_1$ and $V_2$ each represents a member selected from the group consisting of a halogen atom and a hydrogen atom, at least one of $W_1$, $W_2$, $V_1$ and $V_2$ being a halogen atom; $R_1$ and $R_2$ each represents a member selected from the group consisting of a methyl group, an ethyl group, an allyl group, a benzyl group, a p-carboxybenzyl group, an omega-acetyl-sulphonamidopropyl group, an omega-acetyl sulphonamidobutyl group and a beta-methyl-sulphonylaminoethyl group; $R_3$ and $R_4$ each represents a member selected from the group consisting of a methyl group, an ethyl group, an allyl group, a hydroxyethyl group, an acetoxyethyl group, and a phenyl group, and X represents an acid radical, and at least one carbocyanine dye selected from those represented by the following general formula:

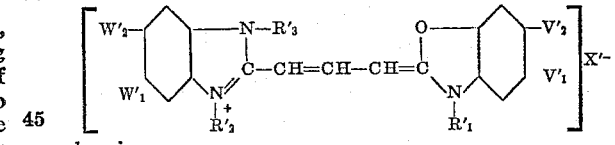

wherein:

$W'_1$ and $W'_2$ each represents a member selected from the group consisting of a halogen atom, a carbalkoxy group, an acyl group and a hydrogen atom, at least one of $W_1$ and $W_2$ being a member selected from the group consisting of a halogen atom, a carbalkoxy group and an acyl group; $V'_2$ represents a member selected from the group consisting of a hydrogen atom and an alkyl group; $V'_1$ represents a member selected from the group consisting of a hydrogen atom, an alkyl group and an aryl group; $R'_1$ and $R'_2$ each represents a member selected from the group consisting of a methyl group, an ethyl group, an allyl group, a benzyl group, a p-carboxybenzyl group, an omega-acetyl-sulphonamido propyl group, an omega-acetyl sulphonamidobutyl group and a beta-methyl-sulphonylaminoethyl group; $R'_3$ represents a member selected from the group consisting of a methyl group, an ethyl group, an allyl group, a hydroxyethyl group, an acetoxy ethyl group and a phenyl group, and X' represents an acid radical.

3. A photographic silver halide emulsion sensitized with a supersensitizing combination of at least one carbocyanine dye selected from those represented by the following general formula:

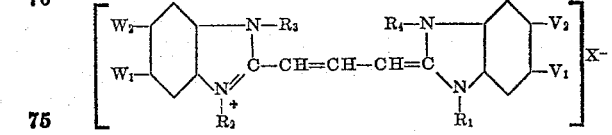

wherein:

$W_1$ and $W_2$ each represents a chlorine atom, $V_1$ and $V_2$ each represents a member selected from the group consisting of a chlorine atom and a hydrogen atom; $R_1$, $R_2$, $R_3$ and $R_4$ each represents a member selected from the group consisting of an alkyl group and an aryl group, and X represents an acid radical, and at least one carbocyanine dye selected from those represented by the following general formula:

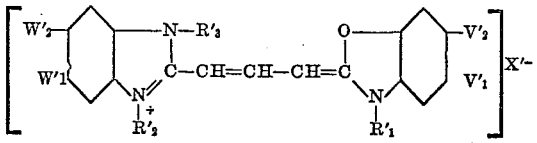

wherein:

$W'_1$ and $W'_2$ each represents a member selected from the group consisting of a chlorine atom and a hydrogen atom, at least one of $W'_1$ and $W'_2$ being a chlorine atom; $V'_2$ represents a hydrogen atom; $V'_1$ represents a member selected from the group consisting of a phenyl group and a p-tolyl-group; $R'_1$, $R'_2$ and $R'_3$ each represents a member selected from the group consisting of an alkyl group and an aryl group, and X' represents an acid radical.

References Cited in the file of this patent
UNITED STATES PATENTS 2,739,149    Van Lare    Mar. 20, 1956
2,751,298    Jones    June 19, 1956
2,778,823    Brooker et al.    Jan. 22, 1957